(12) United States Patent
Sakaguchi et al.

(10) Patent No.: US 9,240,708 B2
(45) Date of Patent: Jan. 19, 2016

(54) ROTATING ELECTRICAL MACHINE FOR VEHICLE

(71) Applicants: Mitsubishi Jidosha Kogyo Kabushiki Kaisha, Tokyo (JP); Mitsubishi Jidosha Engineering Kabushiki Kaisha, Okazaki-shi, Aichi (JP)

(72) Inventors: Yoshihiro Sakaguchi, Tokyo (JP); Toshihiko Ando, Tokyo (JP); Akihisa Kato, Okazaki (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi (JP)

( * ) Notice: Subject to any disclaimer, the term of this patent is extended or adjusted under 35 U.S.C. 154(b) by 0 days.

(21) Appl. No.: 14/445,111

(22) Filed: Jul. 29, 2014

(65) Prior Publication Data
US 2015/0035399 A1  Feb. 5, 2015

(30) Foreign Application Priority Data

Jul. 30, 2013 (JP) .................................. 2013-158355
Apr. 9, 2014 (JP) .................................. 2014-080073

(51) Int. Cl.
*B62D 21/15* (2006.01)
*H02K 5/04* (2006.01)
(Continued)

(52) U.S. Cl.
CPC .. *H02K 5/04* (2013.01); *B60K 1/04* (2013.01); *B60K 6/00* (2013.01); *B60K 1/00* (2013.01); *B60Y 2200/92* (2013.01); *B60Y 2306/01* (2013.01)

(58) Field of Classification Search
CPC .......... B60K 5/1275; B60K 1/04; B60K 5/12; H02K 5/04
USPC .......................... 180/232; 296/187.03, 187.12
See application file for complete search history.

(56) References Cited

U.S. PATENT DOCUMENTS 3,834,476 A * 9/1974 Donaldson ..................... 180/312
5,738,378 A * 4/1998 Yazejian ......................... 280/784
(Continued)

FOREIGN PATENT DOCUMENTS

JP  2011-213290 A  10/2011
JP  2012-166653 A  9/2012
(Continued)

OTHER PUBLICATIONS

Japanese Office Action mailed Aug. 29, 2014 for corresponding JP Application No. 2014-080073.

*Primary Examiner* — John Walters
*Assistant Examiner* — Brian Swenson
(74) *Attorney, Agent, or Firm* — Birch, Stewart, Kolasch & Birch, LLP

(57) ABSTRACT

To provide a rotating electrical machine for a vehicle having efficiently increased protection strength, a protective member mounted on a facing surface facing a side member of a rotating electrical machine disposed on the inner side along the width direction of the vehicle than the side member, has a protective portion apart from the outer surface of a cover forming a facing surface of the rotating electrical machine in an area of the rotating electrical machine facing the side member, and has a space ensured between the outer surface of the cover forming the facing surface of the rotating electrical machine and the protective portion.

5 Claims, 6 Drawing Sheets

(51) Int. Cl.
*B60K 1/04* (2006.01)
*B60K 6/00* (2007.10)
*B60K 1/00* (2006.01)

(56) References Cited

U.S. PATENT DOCUMENTS

| | | | |
|---|---|---|---|
| 8,720,976 B2* | 5/2014 | Oyama et al. | 296/187.09 |
| 2003/0209380 A1* | 11/2003 | Anzai et al. | 180/312 |
| 2013/0270862 A1 | 10/2013 | Hotta et al. | |
| 2013/0341963 A1* | 12/2013 | Hirano et al. | 296/187.03 |
| 2015/0060179 A1* | 3/2015 | Tsuchida et al. | 180/232 |

FOREIGN PATENT DOCUMENTS

| | | |
|---|---|---|
| JP | 2012-236539 A | 12/2012 |
| JP | 2013-129220 A | 7/2013 |
| WO | WO 2013/014745 A1 | 1/2013 |

* cited by examiner

Width direction of vehicle

ROTATING ELECTRICAL MACHINE FOR VEHICLE

BACKGROUND OF THE INVENTION

1. Field of the Invention

The present disclosure relates to a rotating electrical machine for a vehicle to be disposed in an engine room of a vehicle, particularly to a rotating electrical machine for a vehicle to be disposed on an inner side of a side member in a width direction of the vehicle, which side member is provided along a front-back direction of the vehicle.

2. Description of the Related Arts

In an engine room of a vehicle, a pair of side members are disposed on the left side and the right side in the width direction of the vehicle. The side members are each provided along the front-back direction of the vehicle, and an engine, a reduction gear and a rotating electrical machine are disposed between one of the side member and the other. The rotating electrical machine is disposed in a position facing one of the side member (e.g. the side member on the right side) (see JP 2011-213290 A, for example).

Further, it is known that in a vehicle having a pair of side members and a front cross member to connecting the pair of side members to each other, in a case where the right-side half of the vehicle crashes into a barrier (offset crash), the front cross member compressed by the barrier transmits the impact load to the side member, and the side member and its surrounding members are collapsed to absorb the impact load (see JP 2012-166653 A, for example).

Recent years, as an engine, a reduction gear, a rotating electrical machine, and the like are gathered in the engine room of a vehicle, and the rotating electrical machine is disposed facing and in the vicinity of the side member, if the side member is deformed inward along the width direction of the vehicle by e.g. a crash of the vehicle, the rotating electrical machine may be compressed by the side member. Thus, the rotating electrical machine for a vehicle is required to have sufficient protection strength.

However, as the rotating electrical machine for a vehicle is disposed in the vicinity of and facing the side member, increasing of the thickness of its housing is limited, and sufficient protection strength may not be obtained only by increasing the thickness of the housing.

In view of the above object, at least an embodiment of the present invention is to provide a rotating electrical machine for a vehicle capable of improving the protection strength efficiently.

SUMMARY OF THE INVENTION

A rotating electrical machine for a vehicle according to at least one embodiment of the present invention comprises: a rotating electrical machine housing disposed on an inner side in a width direction of the vehicle, of a side member, the side member being a component of a frame of the vehicle and provided along a front-back direction of the vehicle; and a protective member mounted on a facing surface of the rotating electrical machine housing facing the side member; the protective member having a protective portion apart from an outer surface forming the facing surface of the rotating electrical machine housing and in an area where the rotating electrical machine housing and the side member are facing each other.

By employing such a configuration, it is possible to ensure a space between the rotating electrical machine housing and the protective member. As the space functions as a deformation allowance, when the side member is deformed inward in the width direction of the vehicle, the protective member is compressed first, and thus the rotating electrical machine housing will not be immediately compressed. Further, as the rotating electrical machine housing is compressed only after the protective member is deformed in excess of the deformation allowance, the protection strength of the rotating electrical machine is high. It is thereby possible to efficiently increase the protection strength of the rotating electrical machine as compared with a case of increasing the thickness of the housing. Further, as the space between the rotating electrical machine housing and the protective member is ensured, heat generated within the rotating electrical machine will be emitted outside through the space between the rotating electrical machine housing and the protective member. Thus a heat release effect better than a case of increasing the thickness of the rotating electrical housing or a case of the protective member closely attached to the housing can be expected.

In an aspect of the present invention, the protective member is in contact with a mounting surface provided on the facing surface of the rotating electrical machine housing and has a mounting portion into which a mounting bolt is inserted.

By employing such a configuration, the upper surface of the head portion of the mounting bolt will not protrude to a large extent from the outside surface of the protective portion.

In an aspect of the present invention, the rotating electrical machine housing is provided with a fixing bolt having a head portion positioned in an area where the rotating electrical machine housing and the side member are facing each other, and the protective member has, in the protective portion, a hole into which the head portion of the fixing bolt is inserted.

By employing such a configuration, a apace between the periphery of the hole and the head portion of the fixing bolt, heat generated within the rotating electrical machine will be emitted outside through this space. Thus a heat release effect larger than a case of a protective portion having no hole can be expected. Further, as the periphery of the hole and the head portion of the fixing bolt become into contact and become engaged with each other when the protective member is compressed, it is possible to suppress an elongation (deformation) due to bending of the protective member. Thus it is possible to more efficiently increase the protection strength of the rotating electrical machine.

In an aspect of the present invention, an outer surface of the protective portion and an upper surface of the head portion of the fixing bolt are on the same level (the outer surface of the protective portion is flush with the upper surface of the head portion of the fixing bolt).

By employing such a configuration, it is possible to ensure a space between the rotating electrical housing and the protective portion, and thereby to ensure an allowance for contact and engagement between the periphery of the hole and the head portion of the fixing bolt.

In an aspect of the present invention, the rotating electrical machine includes an electric generator and an electric motor, and each of the electric generator and the electric motor comprises the protective member.

The protective member is provided for each of the electric generator and the electric motor, whereby it is possible to efficiently increase the protection strength of the housing of the rotating electrical machine including the electric generator and the electric motor.

DESCRIPTION OF THE PREFERRED EMBODIMENTS

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
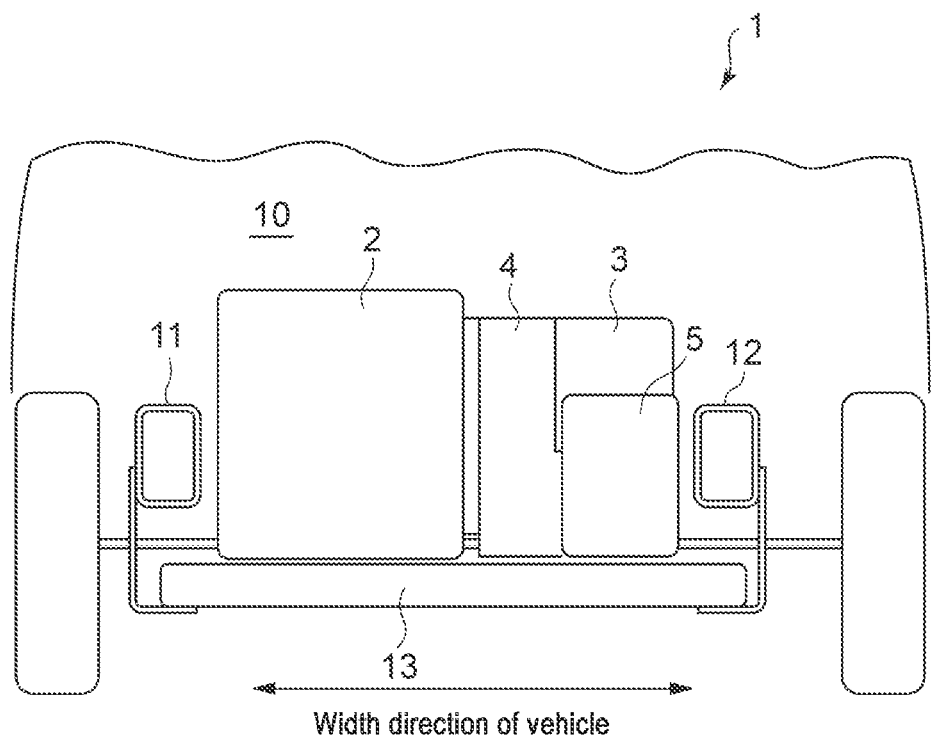
FIG. 1 is a schematic front view of an engine room of a vehicle illustrating its internal structure.

First, a rotating electrical machine for a vehicle according to an embodiment of the present invention, particularly as to mounting position of an electrical generator, will be described with reference to FIG. 1. The rotating electrical machine may be an electrical generator or an electrical motor. FIG. 1 is a schematic front view of an engine room of a vehicle illustrating its internal structure.

The vehicle 1 is a HV (hybrid vehicle) having engine (internal combustion engine) 2 and an electric motor (rotating electrical machine) 3 as the power source, but is not limited thereto, and is applicable to an electric vehicle having an electric motor as the power source.

As illustrated in FIG. 1, within the engine room 10 of the vehicle 1, a pair of side members 11 and 12, and a front cross member 13 to connect the side members 11 and 12 to each other are arranged. The pair of the side members 11 and 12 are disposed on the left side and the right side, respectively, in the width direction of the vehicle. The pair of the side members 11 and 12 are each provided along the front-back direction of the vehicle, and the engine 2, the electrical motor 3, a reduction gear 4, and an electric generator 5 for a vehicle according to an embodiment of the present invention (hereinafter also referred to simply as "generator 5") are arranged between one of the side members i.e. the side member 11 and the other i.e. the side member 12. The generator 5 is disposed so as to be facing the side member 12 (the side member 12 on the right-hand side from the front side of the vehicle) and in the vicinity thereof.

The engine 2 and the reduction gear 4 are arranged in series in the width direction of the vehicle. The electric motor 3 and the generator 5 are arranged adjacent to the reduction gear 4 with an offset along the height direction of the reduction gear 4, while arranged in parallel along the front-back direction of the vehicle.

The side members 11 and 12 are components forming the framework of the body of the vehicle, each comprising a structural member having a tube-like shape with a rectangular-like cross section. In a case of a head-on crash of the vehicle 1, the side members 11 and 12 are collapsed along the direction of the front-back direction of the vehicle to absorb the impact load, and they are bent inward along the width direction of the vehicle to absorb the impact load. Thus, in a case of a head-on crash or a side crash of the vehicle, the side member 12 may be deformed inward along the width direction of the vehicle to compress the generator 5.

Figure 2:
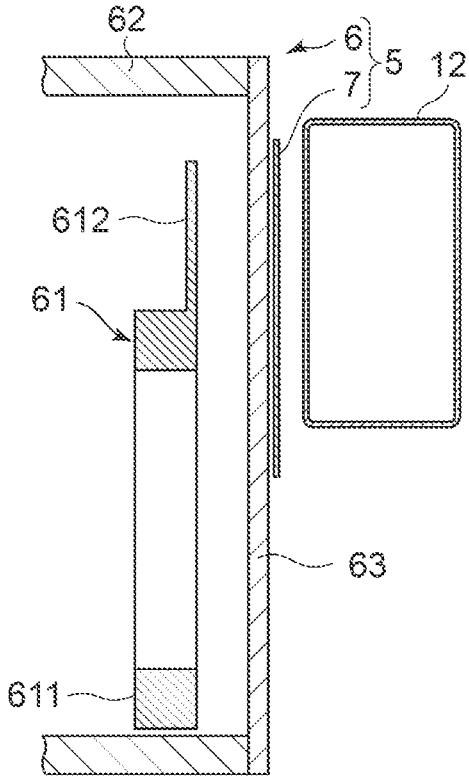
FIG. 2 is a schematic front view of the generator in FIG. 1 according to an embodiment where the rotating electrical machine is a generator.
Figure 3:
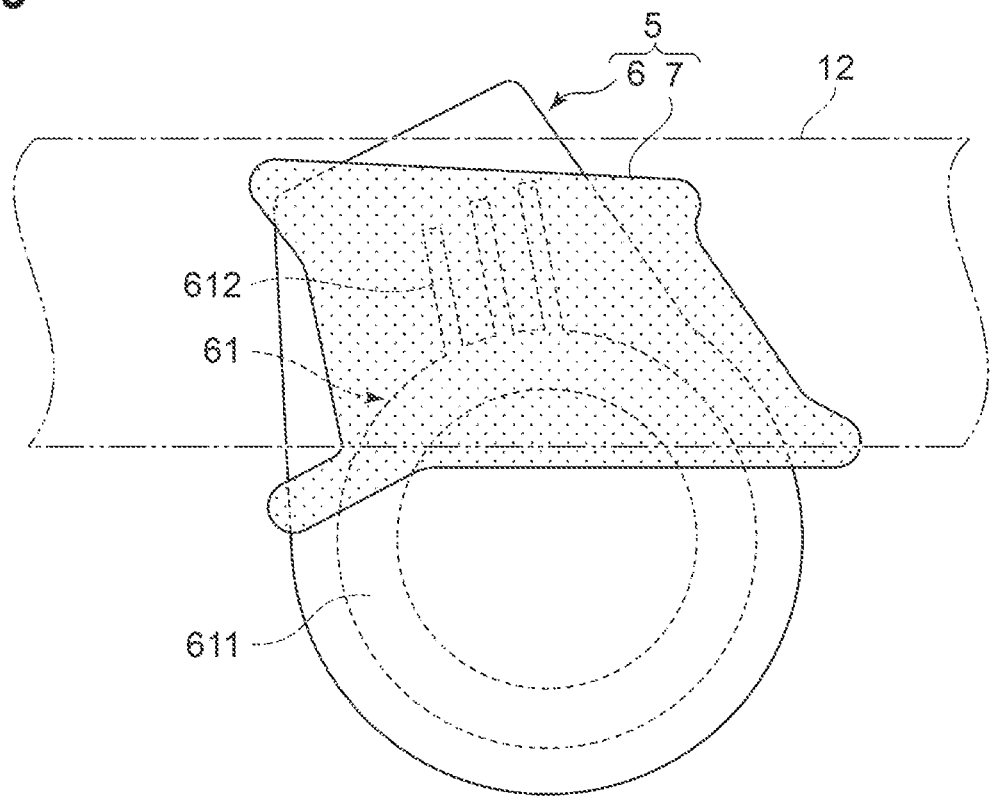
FIG. 3 is a schematic side view of the generator of a vehicle in FIG. 1.

Then, a rotating electrical machine according to an embodiment of the present invention where the rotating machine is a generator, with reference to FIG. 2 and FIG. 3. FIG. 2 is a schematic front view illustrating the side member and the generator in FIG. 1, and FIG. 3 is a schematic side view illustrating the side member and the generator in FIG. 1. In FIG. 3, the side member is drawn with an imaginary line (chain double-dashed line).

As seen in FIG. 1 and FIG. 2, the generator 5 has a transverse section (or a facing surface) larger than the side member 12, and the upper portion is facing the side member 12. As seen in FIG. 2 and FIG. 3, the generator 5 comprises a generator housing (rotating electrical machine housing) 6 and a protective member 7. The generator housing 6 comprises a housing 62 and a cover 63. The generator housing 6 accommodates a high-voltage coil 61 including a coil 611 and a terminal 612, through which a current of a high voltage flows.

The housing 62 is a container of metal (e.g. aluminum) to accommodate the high-voltage coil 61 and has an opening on a side (facing side) facing the side member 12. The housing 62 has a female thread (not shown) formed around the end of the opening, for fixing the cover 63. The housing 62 has ribs 621 and 622 (see FIG. 5 to FIG. 7) inside. The ribs 621 and 622 extend to the opening end of the housing 62 and have female threads 621A and 622A (see FIG. 5 to FIG. 7) formed in its end, similarly to the end of the opening of the housing 62.

The cover 63 is a cover of metal (e.g. aluminum) to close the opening of the housing 62 and has projections formed on the outer surface 63A to increase the stiffness of the cover 63. The cover 63 has a through-hole (not shown) in the edge portion. The through-hole is formed on a position corresponding to the female thread formed around the end of the opening of the housing 62, and a bolt (not shown) inserted into the through-hole is configured to be screwed together with the female thread formed around the end of the opening of the housing 62. The cover 63 is thereby fixed to the housing 62. The cover 63 further has through-holes 631 and 632 (see FIG. 5 to FIG. 7) in the inner portion of the cover 63. The through-holes 631 and 632 are formed on positions corresponding to female threads 621A and 622A formed in the ribs 621 and 622, and bolts 64 and 65 (see FIG. 5 to FIG. 7) inserted into the through-holes 631 and 632 are configured to be screwed together with the female threads 621A and 622A. The cover 63 is thereby tightly fixed to the housing 62. The cover 63 has mounting surfaces 63A1, 63A2 and 63B1 (see FIG. 5 and FIG. 6) on the outer surface 63A. The mounting surfaces 63A1, 63A2 and 63B1 are formed for the purpose of mounting of the protection member 7, and are formed to be flush with one another in the area where the cover 63 faces the side member 12 and are formed to protrude from the flush plane outside the area where the cover 63 faces the side member 12. Each of the mounting surface 63A1, 63A2 and 63B1 is flatly formed, and the cover 63 has wide and thin grooves 63C1 and 63C2 (see FIG. 5 and FIG. 6) on the inner side than the mounting surfaces 63A1 and 63A2 formed in the area where the cover 63 faces to the side member 12.

Figure 4:
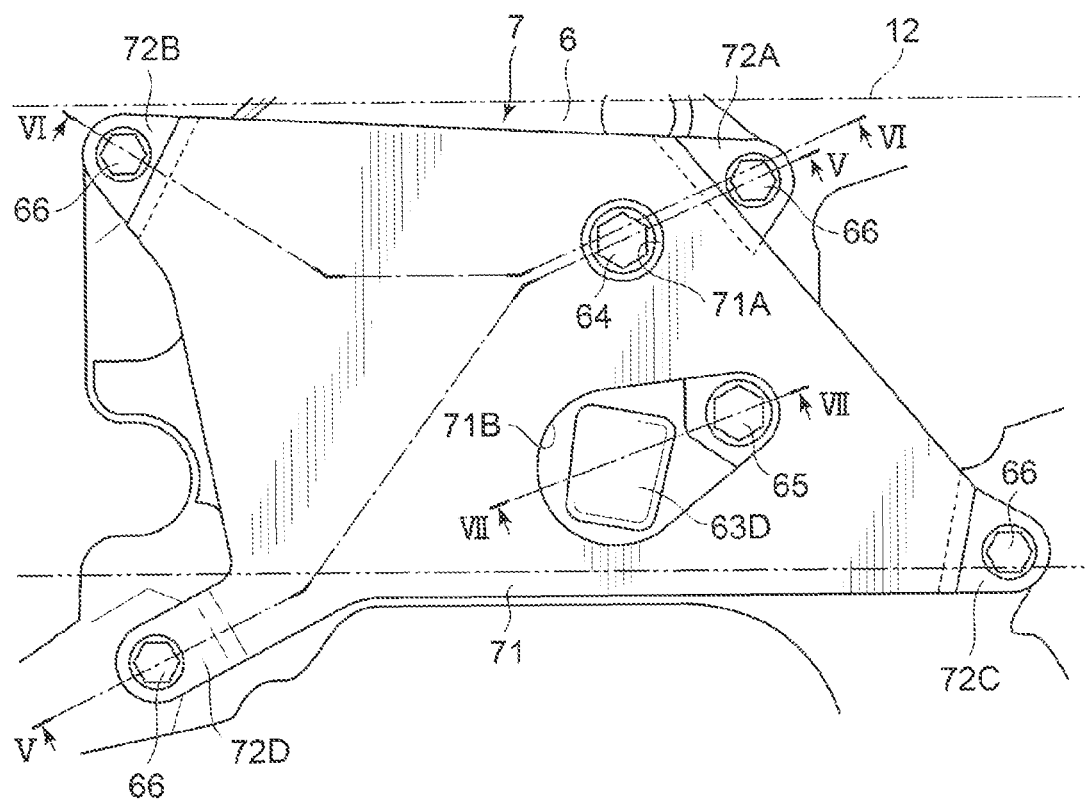
FIG. 4 is a side view illustrating the protective member in FIG. 3 in detail
Figure 5:
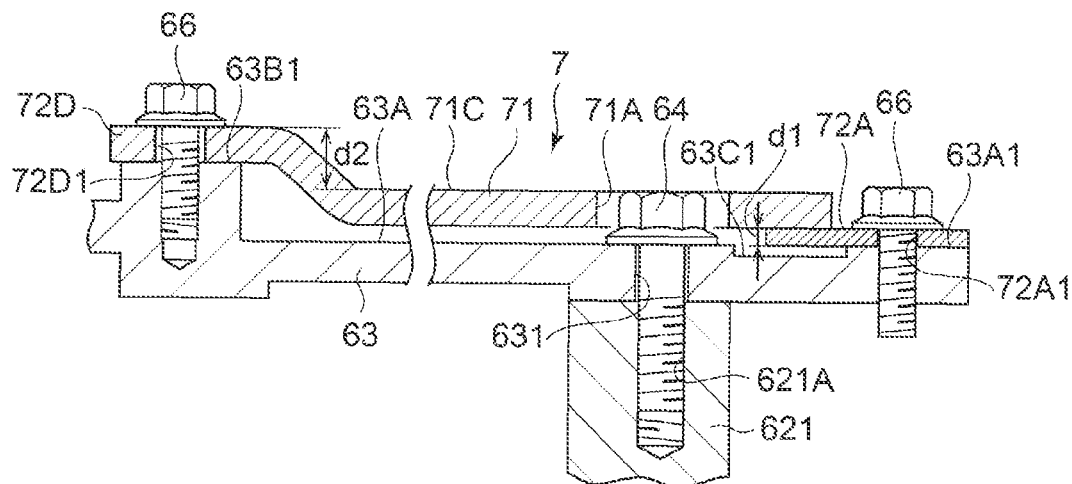
FIG. 5 is a cross-sectional view along the line V-V in FIG. 4.
Figure 6:
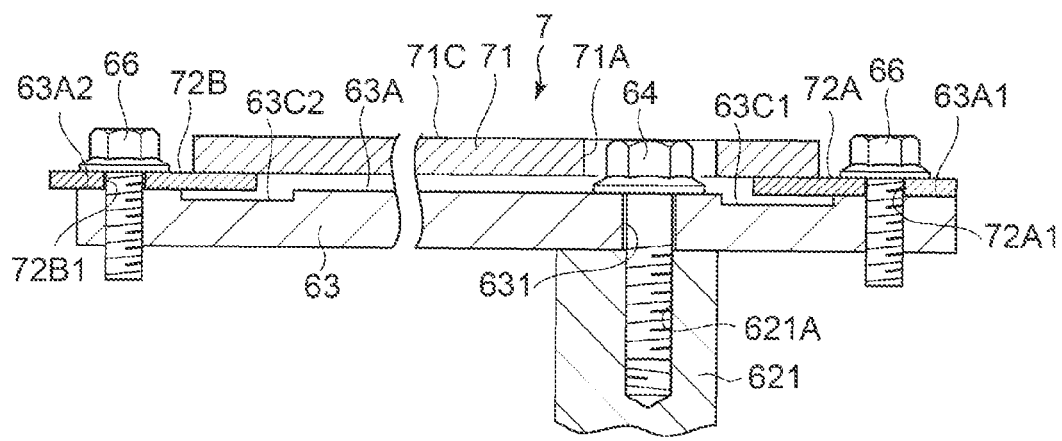
FIG. 6 is a cross-sectional view along the line VI-VI in FIG. 4.
Figure 7:
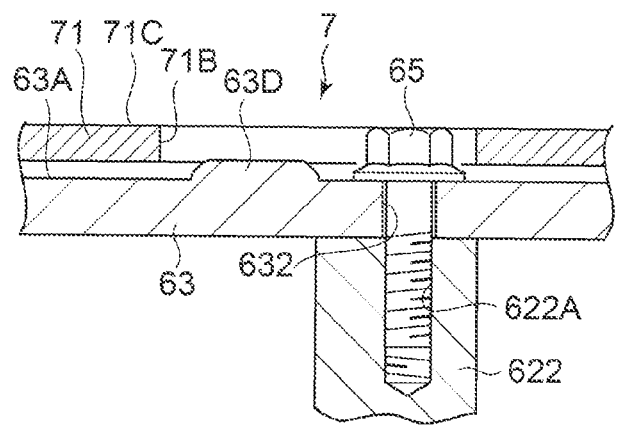
FIG. 7 is a cross-sectional view along the line VII-VII in FIG. 4.

Then, the protective member will be described in detail with FIG. 4 to FIG. 7. FIG. 4 is a side view illustrating the protective member in FIG. 3 in detail. FIG. 5 is a cross-sectional view along the line V-V in FIG. 4, FIG. 6 is a cross-sectional view along the line VI-VI in FIG. 4, and FIG. 7 is a cross-sectional view along the line VII-VII in FIG. 4. In FIG. 4, the side member is drawn with an imaginary line (chain double-dashed line).

As illustrated in FIG. 4, the protective member 7 is for the purpose of increasing the protection strength of the upper portion of the generator housing 6 facing the side member 12 and comprises a metal plate having a good tensile strength, such as a steel plate. The protective member 7 has a quadrangle shape approximate to parallelogram and has a protective portion 71 and mounting portions 72A, 72B, 72C and 72D. The protective portion 71 is provided apart from the outer surface 63A of the cover 63 in an area where the rotating electrical machine housing is facing the side member 12. It is thereby possible to ensure a space between the outer surface 63A of the cover 63 and the protective portion 71 of the protective member 7 as seen in FIG. 5 to FIG. 7.

Further, as illustrated in FIG. 4, the mounting portions 72A, 72B, 72C and 72D are disposed in the vertex portion of the quadrangle shape of the protective member 7. As illustrated in FIG. 5 and FIG. 6, among the mounting portions 72A, 72B, 72C and 72D, the mounting portions 72A, 72B and 72C facing the side member 12 are provided closer to the cover 63 (generator housing 6) than the protective portion 71 and are closely attached to the mounting portions 63A1 and 63A2 provided in the area where the rotating electrical machine housing is facing the side member 12. The mounting portions 72A, 72B and 72C according to this embodiment are each formed from a member other than the protective member 7 and are joined to the protective portion 71 of the protective member 7 by welding to form a difference d1 in level between the inner surface (the surface on the cover side) of the protective portion 71 and the inner surface (the surface on the cover side) of the mounting portions 72A, 72B and 72C. Further, the mounting portion 72D outside the area where the rotating electrical machine housing is facing the side member 12 is disposed on the outer side than the protective portion 71 and is closely attached to the mounting surface 63B1 protruding from the mounting surfaces 63A1 and 63A2 provided in the area where the rotating electrical machine housing is facing the side member 12. Further, as illustrated in FIG. 5, the mounting portion 72D according to this embodiment is integrally formed with the protective portion 71 by bending its extending portion to form a difference d2 in level protruding from the outer surface 71C of the protective portion 71. The mounting portions 72A, 72B, 72C and 72D have through-holes 72A1, 72B 1 and 72D 1, respectively, and the protective member 7 is mounted thereon by bolts (mounting bolts) 66 being inserted through the through-holes 72A1, 72B1 and 72D1.

Further, as illustrated in FIG. 4 to FIG. 6, in order to fix the cover 63 to the housing 62, a bolt (fixing bolt) 64 to be screwed together with the female thread 621A provided in the rib 621 on the housing 62 side, is fastened, and the protective portion 71 has a hole 71A into which the bolt 64 is inserted. The hole 71A has a size sufficient for the head portion of the bolt 64 to be inserted. The upper surface of the head portion of the bolt 64 inserted into the hole 71A becomes flush with the outer surface 71C of the protective portion 71. The size of the hole 71A is not limited as long as the head portion of the bolt 64 can be inserted into the hole 71A, even if the hole 71A is such that a tool to loosen the bolt 64 cannot be used from outside the protective portion 71.

Further, as illustrated in FIG. 4 and FIG. 7, the protective portion 71 has a hole 71B, into which the bolt 65 to be screwed together with the female thread 622A formed in the rib 622 on the housing 62 side to fix the cover 63 to the housing 62, and a convex portion 63D formed in the cover 63 to be used for positioning of the protective member 7 are inserted.

The hole 71B has a sufficient size such that the head portion of the bolt 65 and the convex portion 63D formed in the cover 63 can be inserted in the hole 71B. The periphery of the hole 71B has an arc shape of which center is the head portion of the bolt 65, as a part.

In the above-described generator 5 according to an embodiment of the present invention, as illustrated in FIG. 5 to FIG. 7, a space is ensured between the cover 63 (generator housing 6) and the protective member 7. This space functions as a deformation allowance for the protective member 7. Heat generated within the generator housing 6 may be passed through between the cover 63 and the protective member 7, between the hole 71A formed in the protective portion 71 of the protective member 7 and the head portion of the bolt 64, and between the hole 71B, and the bolt 65 and the convex portion 63D, to be emitted outside.

Figure 8:
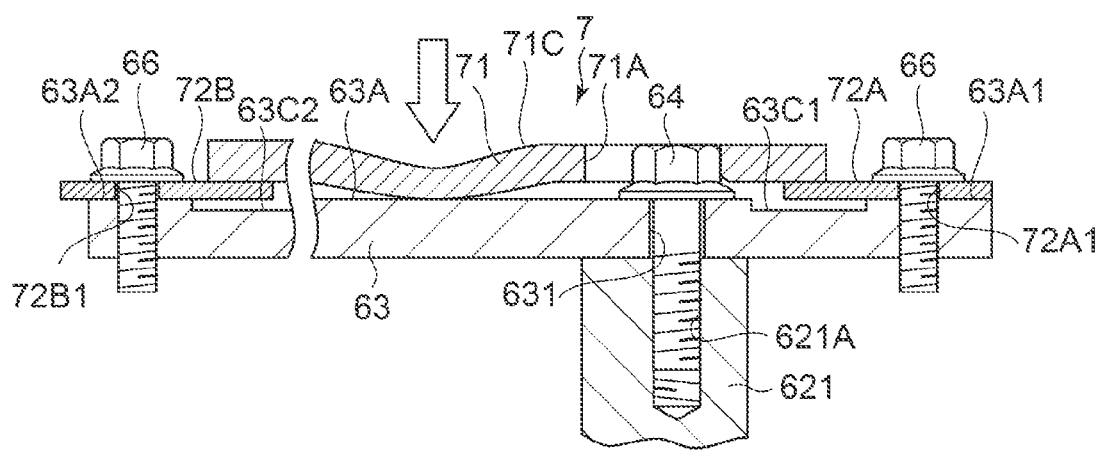
FIG. 8 is a cross-sectional view along the line VI-VI in a case of deformation of the protective member.

If the side member 12 is deformed inward in the width direction of the vehicle by e.g. a crash of the vehicle, the protective member 7 is compressed by the side member 12. At this time, the protective member 7 is compressed first, and the cover 63 will not be immediately compressed. If the protective member 7 is compressed by the side member 12 and then the protective portion 71 is deformed toward the cover 63 as seen in FIG. 8, the periphery of the hole 71A becomes into contact and engaged with the side surface of the head portion of the bolt 64. It is thereby possible to suppress deformation (elongation) of the protective portion 71. If the protective member 7 is further compressed by the side member 12, the protective portion 71 and the cover 63 will be together deformed.

As described above, in the generator 5 according to an embodiment of the present invention, a space is ensured between the cover 63 (generator housing 6) and the protective member 7. As this space functions as a deformation allowance of the protective member 7, if the side member 12 is deformed inward along the width direction of the vehicle, the protective member 7 is firstly compressed, and thus the cover 63 (generator housing 6) will not be immediately compressed. Further, as the cover 63 (generator housing 6) will not compressed until the protective member 7 is deformed, the protection strength of the generator 5 is high. It is thereby possible to efficiently increase the protection strength of the generator as compared with a case of increasing the thickness of the cover 63.

Further, as a space is ensured between the cover 63 (generator housing 6) and the protective member 7, head generated within the generator housing 6 can be emitted outside through between the cover 63 and the protective member 7. Thus a heat release effect better than a case of increasing the thickness of the cover 63 or a case of the protective portion 71 closely attached to the cover 63 can be expected.

Further, as the protective member 7 is disposed on the cover 63 side (generator housing 6 side) then the protective portion 71 in the area where the rotating electrical machine and the side member 12 are facing each other and is in contact with mounting surfaces 63A1 and 63A2 provided on the cover 63 and has mounting portions 72A, 72B and 72C into which the bolt 66 is inserted, the upper surface of the head portion of the bolt 66 will not protrude to a large extent from the outside surface 71C of the protective portion 71. Further, the upper surface of the head portion of the bolt 66 mounted in the area where the rotating electrical machine and the side member 12 are facing each other may be flush with the outer surface 71C of the protective portion 71. It is thereby possible to ensure a space between the outer surface 71C of the protective portion 71 and the side member 12, and an air flow in the space, whereby a heat release effect can be expected.

Further, as a space between the periphery of the hole 71A of the protective portion 71 and the head portion of the bolt 64 is ensured, heat generated within the generator housing 6 can be emitted outside through this space. Thus a heat release effect better than a case of the protective portion 71 having no hole 71A can be expected. Further, as the side member 12 is deformed inward along the width direction of the vehicle, and the periphery of the hole 71A of the protective portion 71 is in contact and engaged with the bolt 64 when the protective member 7 is compressed, it is possible to suppress an elongation (deformation) of the protective member 7 due to bending of the protective portion 71. It is thereby possible to increase the protection strength of the generator 5 more efficiently.

Further, as the outer surface 71C of the protective portion 71 is flush with the upper surface of the head portion of the bolt 64, a space can be ensured between the outer surface 71C of the protective portion 71 and the side member 12.

Further, as the outer surface 71C of the protective portion 71 is flush with the upper surface of the head portion of the bolt 64, the periphery of the hole 71A can be in contact and engaged with the head portion of the bolt 64 more surely when the side member 12 is deformed inward along the width direction of the vehicle to compress the protective member 7 at the time of a vehicle crash, than a case where the upper surface of the head portion of the bolt 64 is positioned closer to the cover 63 than the outer surface 71C of the protective portion 71. It is thereby possible to more surely suppress an elongation (deformation) due to bending of the protective member 7.

Figure 9:
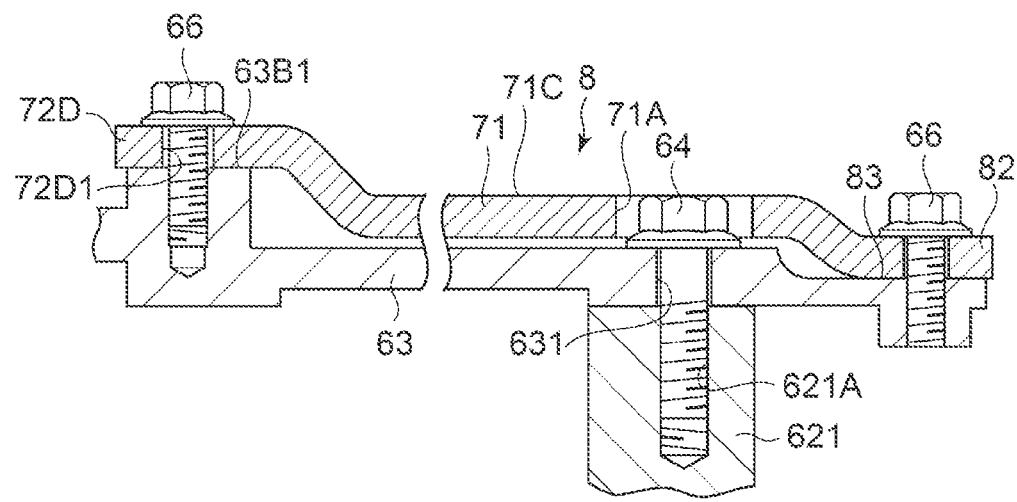
FIG. 9 is a cross-sectional view of a protective member according to an embodiment.

Then, a modified example of a protective member will be described with reference to FIG. 9. FIG. 9 is a cross-sectional view of a protective member of the modified example, which is corresponding to FIG. 5. The same elements as those of the above embodiment are assigned with the same reference numerals as those of the above embodiment, and the same description thereof will be omitted.

The protective member 8 as seen in FIG. 9 has a different mounting portion from the above protective member 7. The mounting portion 82 of the protective member 8 is disposed closer to the cover 63 (generator housing 6) than the protective portion 71 and is closely attached to the mounting surface 83 provided in an area where the rotating electrical machine and the side member 12 are facing each other. The mounting portion 82 is integrally formed with the protective portion 71 by bending its extending portion to form a difference in level between the inner surface (the surface on the cover side) of the protective portion 71 and the inner surface (the surface on the cover side) of the mounting portions 82. Employing such a configuration, welding of the protective portion 71 with the mounting portions 72A, 72B and 72C as for the above protective member 7 becomes unnecessary. Further, manufacture of the protective member 7 becomes easy.

Then, an embodiment where the rotating electrical machine for a vehicle is an electric motor, i.e. an electrical motor 3 will be described with reference to FIG. 10 and FIG. 11. In the above embodiment, an example of the generator 5 comprising the generator housing (rotating electrical machine housing) 6 and the protective member 7 has been described, as illustrated in FIG. 2 and FIG. 3. In this embodiment, a configuration including an electric motor 3 and a motor protective member 312 will be described as illustrated in FIG. 10 and FIG. 11.

The electric motor 3 comprises a motor housing (rotating electrical machine housing) 311 and a motor protective member 312. The motor housing 311 includes a motor housing body 313 and a motor cover 314.

Figure 10:
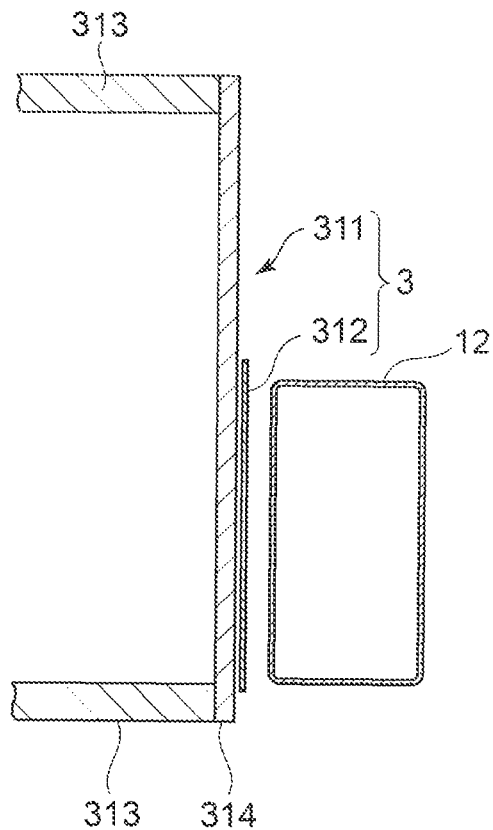
FIG. 10 is a schematic front view of the electric motor in FIG. 1 according to an embodiment where the rotating electrical machine is an electric motor, which is a view corresponding to FIG. 2.
Figure 11:
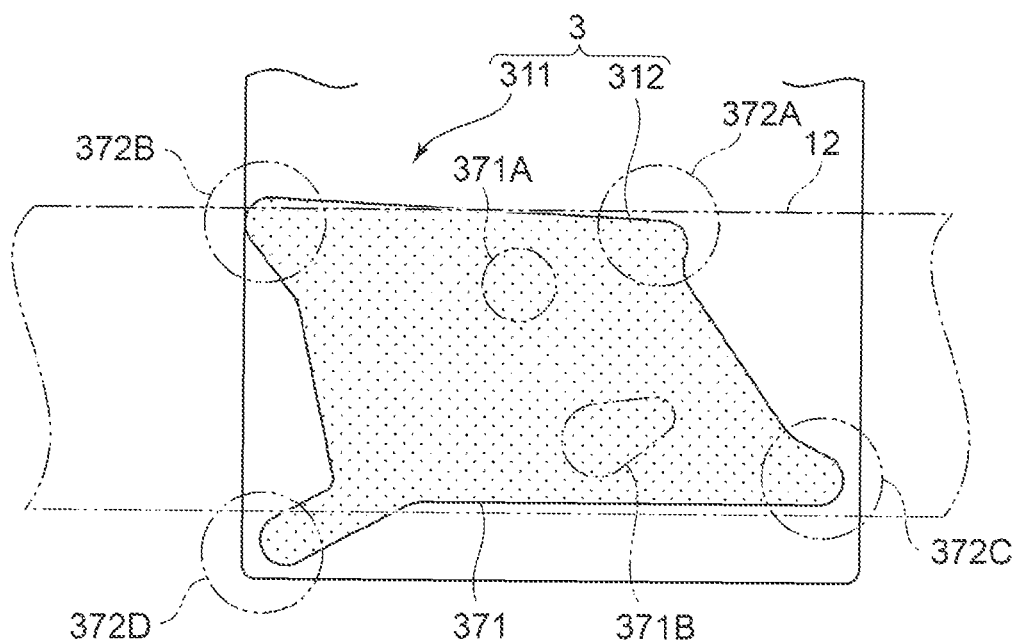
FIG. 11 is a schematic side view of the electric motor of a vehicle in FIG. 10, which is a view corresponding to FIG. 3.

As seen in FIG. 10, the electric motor 3 has a transverse section (or a facing surface) larger than the side member 12, and a part of a side surface of the electric motor 3 and the side member 12 are facing each other.

The motor housing body 313 is a container of a metal to accommodate a motor coil and has an opening on a side (facing side) facing the side member 12. The motor cover 314 is fixed by a bolt (not shown) to the motor housing body 313 to close the opening. The motor housing body 313 has a shape of a cylindrical tube or a rectangular tube, for example, and the end of the opening is closed by the motor cover 314.

As illustrated in FIG. 10 and FIG. 11, the motor protective member 312 has, similarly to the protective member 7, mounting portions 372A, 372B, 372C and 372D as mounting portions for the motor cover 314. The motor protective member 312 has a quadrangle-like shape, and the mounting portions are disposed in the vertex portion of the quadrangle-like shape.

Among the mounting portions 372A, 372B, 72C and 72D, the mounting portions 372A, 372B and 372C facing the side member 12 have the same structures as the mounting portions 72A, 72B and 72C of the protective member 7, respectively, and the mounting portions 372D outside the area facing the side member 12 has the same structure as the mounting portion 72D of the protective member 7.

The mounting portion 372D is provided on the side outer (outer side in along the width direction of the vehicle) than the motor protective portion 371 in the area facing the side member 12 and is closely attached to a mounting surface protruding from the mounting surface provided in the area facing the side member 12.

Further, the motor protective member 312 has a hole 371A and a hole 371B, which correspond to holes into which e.g. a head portion of a fixing bolt is inserted, similarly to the hole 71A and the hole 71B of the protective member 7.

By employing such a motor protective member 312, as with the case of the protective member 7, a space between the motor cover 314 and the motor protective member 312 is ensured, and this space functions as a deformation allowance for the motor protective member 12. Thus, if the side member 12 is deformed inward along the width direction of the vehicle, the motor protective member 312 is firstly compressed, and the motor cover 314 (motor housing 311) will not be immediately compressed. Further, as the motor cover 314 (motor housing 311) will not be compressed until the motor protective member 312 is deformed, the protection strength of the electric motor 3 becomes high. It is thereby possible to efficiently increase the protection strength relative to the case of increasing the thickness of the motor cover 314.

Further, as a space between the motor cover 314 and the motor protective member 312 is ensured, heat generated within the electric motor 3 can be emitted outside through the space between the motor cover 314 and the motor protective member 312. This a heat release effect can be expected.

Further, by employing the motor protective member 312, the same operation and effect can be obtained as with the case of the above protective member 7.

Further, the protective member 7 for the generator housing 6 and the motor protective member 312 for the motor housing may be arranged along the front-back direction of the vehicle and integrally formed. It is thereby possible to more efficiently increase the protection strength of the rotating electrical machine including the generator housing 6 and the motor housing 311.

INDUSTRIAL APPLICABILITY

A rotating electrical machine for a vehicle according to at least one embodiment of the present invention is capable of efficiently increasing the protection strength and is applicable to a vehicle in which a generator and an electric motor are disposed close to and facing a side member.

What is claimed is:

1. A rotating electrical machine for a vehicle to be mounted on the vehicle, comprising:
    a rotating electrical machine housing disposed on an inner side in a width direction of the vehicle, of a side member, the side member being a component of a frame of the vehicle and provided along a front-back direction of the vehicle; and
    a protective member mounted on a facing surface of the rotating electrical machine housing facing the side member;
    the protective member having a protective portion that faces the facing surface of the rotating electrical machine housing in an area where the rotating electrical machine housing and the side member are facing each other, the protective member being provided so as to define a space between the protective member and an outer surface of the rotating electrical machine housing, and
    the rotating electrical machine housing being provided with a fixing bolt having a head portion positioned in an area where the rotating electrical machine housing and the side member are facing each other, and the protective member has, in the protective portion, a hole into which the head portion of the fixing bolt is inserted.

2. The rotating electrical machine for a vehicle according to claim 1, wherein the protective member is in contact with a mounting surface provided on the facing surface of the rotating electrical machine housing and has a mounting portion into which a mounting bolt is inserted.

3. The rotating electrical machine for a vehicle according to claim 2, wherein the rotating electrical machine includes an electric generator and an electric motor, and each of the electric generator and the electric motor comprises the protective member.

4. The rotating electrical machine for a vehicle according to claim 1, wherein an outer surface of the protective portion and an upper surface of the head portion of the fixing bolt are on the same level.

5. The rotating electrical machine for a vehicle according to claim 1, wherein the rotating electrical machine includes an electric generator and an electric motor, and each of the electric generator and the electric motor comprises the protective member.

* * * * *